Patented Jan. 7, 1936

2,026,819

UNITED STATES PATENT OFFICE 2,026,819

PROCESS OF PREPARING A CATALYST FOR THE REDUCTION OF SULPHUR DIOXIDE

Maitland C. Boswell, Toronto, Ontario, Canada

No Drawing. Application October 27, 1932, Serial No. 639,783

5 Claims. (Cl. 23—233)

This invention relates to improved methods of forming a catalyst for the reduction of sulphur dioxide as disclosed in my co-pending application No. 277,398 filed May 12, 1928, now Patent No. 1,880,741 issued October 4, 1932. Various specific methods of forming a catalyst are therein described, but in every case the process involved at some stage the use of or formation of an oxide of a metal of the iron group which was subsequently sulphurized by the action of sulphur dioxide and a reducing gas to form a complex of the metal with sulphur containing more than 1 and less than 2 atoms of sulphur for each atom of the metal. In the present invention my object is to devise methods of manufacture which do not necessarily involve the use of or the conversion of the whole of the material into the form of oxide but which are also applicable to the treatment of oxides and hydroxides. The materials I employ are selected from a group of materials including the following compounds of metals of the iron group—oxides, hydroxides, sulphides, hydrated sulphides, and oxysulphides. For present purposes "metals of the iron group" comprises iron, nickel and cobalt.

Instead of employing a single compound a mixture may be employed and the materials may be either natural or artificially prepared.

I have, for instance successfully treated hydrated sulphides, oxides or hydrated oxides, oxysulphides or mixtures of hydrated sulphides and oxides.

In carrying out my process I partly dehydrate an hydrated sulphide and, before sulphurization, may so treat it and for such a length of time that the sulphide is not oxidized but carries oxygen and has a higher power of combining with sulphur dioxide.

The partial dehydration is important as otherwise complexes are formed which have a much smaller capacity of taking up sulphur dioxide and carrying much less oxygen to the sulphide than the product after partial dehydration.

The following is a specific example of the process. An hydrated sulphide of a metal of the iron group or a mixture of a sulphide with an oxide or hydrated oxide is heated at a temperature preferably about 100° C. to partly dehydrate it until the greater part of the water which can be removed at that temperature has passed off. The material is then exposed to the action of air or oxygen at a temperature insufficient to cause the evolution of sulphur dioxide (such as ordinary room temperature). The effect of this oxygenating treatment is to give the material a high power of combination with sulphur dioxide.

The material is now exposed to the action of sulphur dioxide and a reducing gas, preferably hydrogen. The preferred method of treatment is to first treat it with sulphur dioxide alone at a temperature of between 100° and 200° C. until approximately saturated with that gas. Thereafter the mixture is treated with a mixture of hydrogen and sulphur dioxide (2 to 1) preferably at a temperature within the range 200° to 300° C.

The temperature during the dehydration process and the degree of dehydration prior to sulphurization may vary widely, but for maximum rate of absorption of sulphur dioxide and the rapid building up of a catalyst of high activity the dehydration should take place in an inert gas at temperatures between 100° and 140° C. in order to insure that there shall be no air present.

Complexes made by these methods are exceedingly active as catalysts for the reduction of sulphur dioxide according to the process set forth in my co-pending application hereinbefore referred to.

The proportion of sulphur to metal in the catalyst prepared as above will vary, but will always be more than 1 atom of sulphur to one of metal and less than 2 to one of metal.

The catalyst prepared as above is substantially the same as that prepared by the processes set out in the prior patent hereinbefore referred to and is in effect a partly reduced sulphide of the metal employed.

Further investigation, however, has shown that a more general formula can now be stated for the catalyst as $(FeS)_x (H_2S)_y (H_2O)_z$ which embraces the specific case $FeS_{1.7}$ of the prior specification.

It appears then that the catalyst may be considered as a sulphide of the metal carrying adsorbed hydrogen sulphide in varying proportions between 1:1 and 1:2 and to such hydrogen sulphide so held the activity of the catalyst is due.

While generally speaking the proportion of metal to sulphur works out in the neighborhood of 1:1.7 by refinements in the treatment the proportion may be made more nearly 1:1 with an increase in the activity of the product.

What I claim as my invention is:

1. A process of producing a catalyst which consists in partly dehydrating a compound or compounds of a metal of the iron group, selected from a group of compounds consisting of hydrated sulphides, and a mixture of hydrated sulphides with hydroxides or oxides, in the absence of air, subjecting the partly dehydrated material to the action of oxygen to increase its susceptibility to the action of sulphur dioxide; subjecting it to the action of sulphur dioxide at more than room temperature; and finally subjecting the material to the action of hydrogen and sulphur dioxide at a higher temperature than that of the previous treatment with sulphur dioxide.

2. A process of producing a catalyst which consists in partly dehydrating at temperatures substantially within the range 90° to 140° C., a compound or compounds of a metal of the iron group, selected from a group of compounds consisting of hydrated sulphides, and a mixture of hydrated sulphides with hydroxides or oxides, in the absence of air, subjecting the partly dehydrated material to the action of oxygen at approximately room temperature, to increase its susceptibility to the action of sulphur dioxide; subjecting it to the action of sulphur dioxide at temperatures substantially within the range 100° to 200° C.; and finally subjecting the material to the action of hydrogen and sulphur dioxide at temperatures substantially within the range 200° to 300° C.

3. A process of producing a catalyst which consists in partly dehydrating a compound or compounds of a metal of the iron group, selected from a group of compounds consisting of hydrated sulphides, and a mixture of hydrated sulphides with hydroxides or oxides, exposing the material to oxygen to cause it to take up oxygen without evolving sulphur dioxide; and thereafter sulphurizing the material by the action of sulphur dioxide and hydrogen.

4. A process of producing a catalyst which consists in partly dehydrating a compound or compounds of a metal of the iron group selected from a group of compounds consisting of hydrated sulphides and a mixture of hydrated sulphides with hydroxides or oxides, in the absence of air; subjecting the partly dehydrated material to the action of sulphur dioxide at temperatures substantially within the range 100° to 200° C.; and finally subjecting the material to the action of hydrogen and sulphur dioxide at temperatures substantially within the range 200° to 300° C.

5. A process of producing a catalyst which consists in partly dehydrating, in an inert gas, a compound or compounds of a metal of the iron group selected from a group of compounds consisting of hydrated sulphides and a mixture of hydrated sulphides with hydroxides or oxides, subjecting the partly dehydrated material to the action of sulphur dioxide at temperatures substantially within the range 100° to 200° C.; and finally subjecting the material to the action of hydrogen and sulphur dioxide at temperatures substantially within the range 200° to 300° C.

MAITLAND C. BOSWELL.